US009358886B2

(12) United States Patent
Hwang et al.

(10) Patent No.: US 9,358,886 B2
(45) Date of Patent: Jun. 7, 2016

(54) METHOD FOR CONFIGURING USER INTERFACE OF HEAD UNIT OF VEHICLE DYNAMICALLY BY USING MOBILE TERMINAL, AND HEAD UNIT AND COMPUTER-READABLE RECORDING MEDIA USING THE SAME

(71) Applicant: Obigo Inc., Gyeonggi-do (KR)

(72) Inventors: Doe Yun Hwang, Seoul (KR); Shin Gyu Kang, Seoul (KR); Hyung Woon Song, Seoul (KR)

(73) Assignee: Obigo Inc., Gyeonggi-Do (KR)

( * ) Notice: Subject to any disclaimer, the term of this patent is extended or adjusted under 35 U.S.C. 154(b) by 96 days.

(21) Appl. No.: 14/291,663

(22) Filed: May 30, 2014

(65) Prior Publication Data

US 2015/0266378 A1 Sep. 24, 2015

(30) Foreign Application Priority Data

Mar. 18, 2014 (KR) .......................... 10-2014-0031622

(51) Int. Cl.
*B60K 35/00* (2006.01)
*G06F 3/14* (2006.01)
*G06F 9/44* (2006.01)

(52) U.S. Cl.
CPC .............. *B60K 35/00* (2013.01); *G06F 3/1454* (2013.01); *G06F 9/4443* (2013.01); *B60K 2350/1004* (2013.01); *B60K 2350/1032* (2013.01); *B60K 2350/355* (2013.01); *G09G 2380/10* (2013.01)

(58) Field of Classification Search
CPC ......... B60K 35/00; G06F 3/14; G06F 3/1454; G06F 3/147
USPC ............................................................ 701/2
See application file for complete search history.

(56) References Cited

U.S. PATENT DOCUMENTS

| 7,966,111 | B2* | 6/2011 | Moinzadeh | ............. | B60R 25/00 |
| | | | | | 701/36 |
| 9,002,574 | B2* | 4/2015 | Garrett | ................... | G06F 9/4443 |
| | | | | | 701/24 |
| 2009/0128307 | A1* | 5/2009 | Hentsch | ................. | B60K 35/00 |
| | | | | | 340/425.5 |
| 2010/0036600 | A1* | 2/2010 | Shinmyoh | .......... | G01C 21/3688 |
| | | | | | 701/532 |
| 2013/0013148 | A1* | 1/2013 | Park | ....................... | G06F 3/1454 |
| | | | | | 701/36 |
| 2013/0162502 | A1* | 6/2013 | Lee | ......................... | G09G 5/003 |
| | | | | | 345/1.2 |
| 2013/0326397 | A1* | 12/2013 | Kim | ....................... | G06F 3/0484 |
| | | | | | 715/781 |
| 2014/0078022 | A1* | 3/2014 | Dusterhoff | ............ | G06F 3/1423 |
| | | | | | 345/3.1 |
| 2014/0100740 | A1* | 4/2014 | Chutorash | .......... | G01C 21/3661 |
| | | | | | 701/36 |
| 2014/0277937 | A1* | 9/2014 | Scholz | ...................... | G06F 7/00 |
| | | | | | 701/36 |
| 2015/0015479 | A1* | 1/2015 | Cho | ......................... | G06F 3/013 |
| | | | | | 345/156 |

* cited by examiner

Primary Examiner — John Q Nguyen
Assistant Examiner — Anshul Sood
(74) Attorney, Agent, or Firm — Husch Blackwell LLP

(57) ABSTRACT

The present invention relates to a method for configuring a user interface of a head unit of a vehicle by using a mobile terminal. The method includes steps of: (a) allowing the head unit of the vehicle to acquire information on at least one application stored at an executable state in the mobile terminal, if the mobile terminal is connected to the head unit; (b) allowing the head unit to decide a specific template interoperable with the application among multiple templates stored in the head unit by referring to the acquired information on the application; and (c) deciding a display mode of the specific template by referring to at least one piece of information on the number of acquired application and the driving state of the vehicle and displaying the acquired application on a screen of the head unit by using the decided display mode of the specific template.

15 Claims, 8 Drawing Sheets

FIG. 4
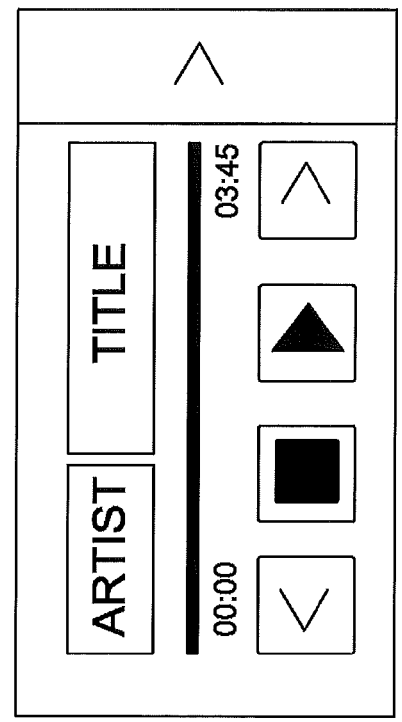
(A)
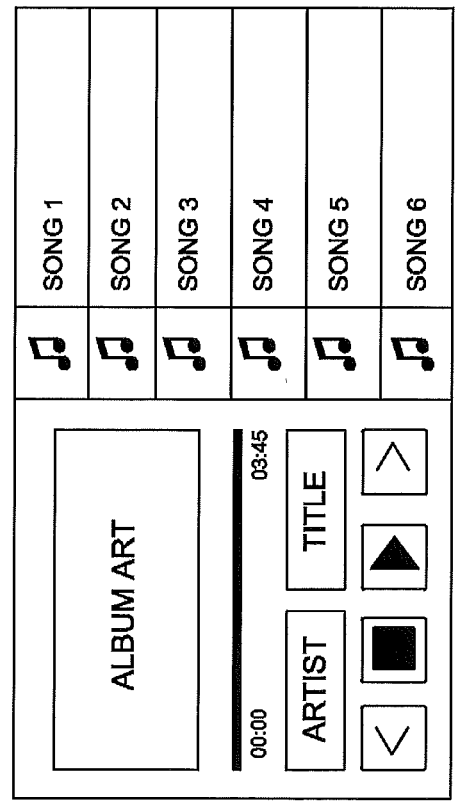
(B)

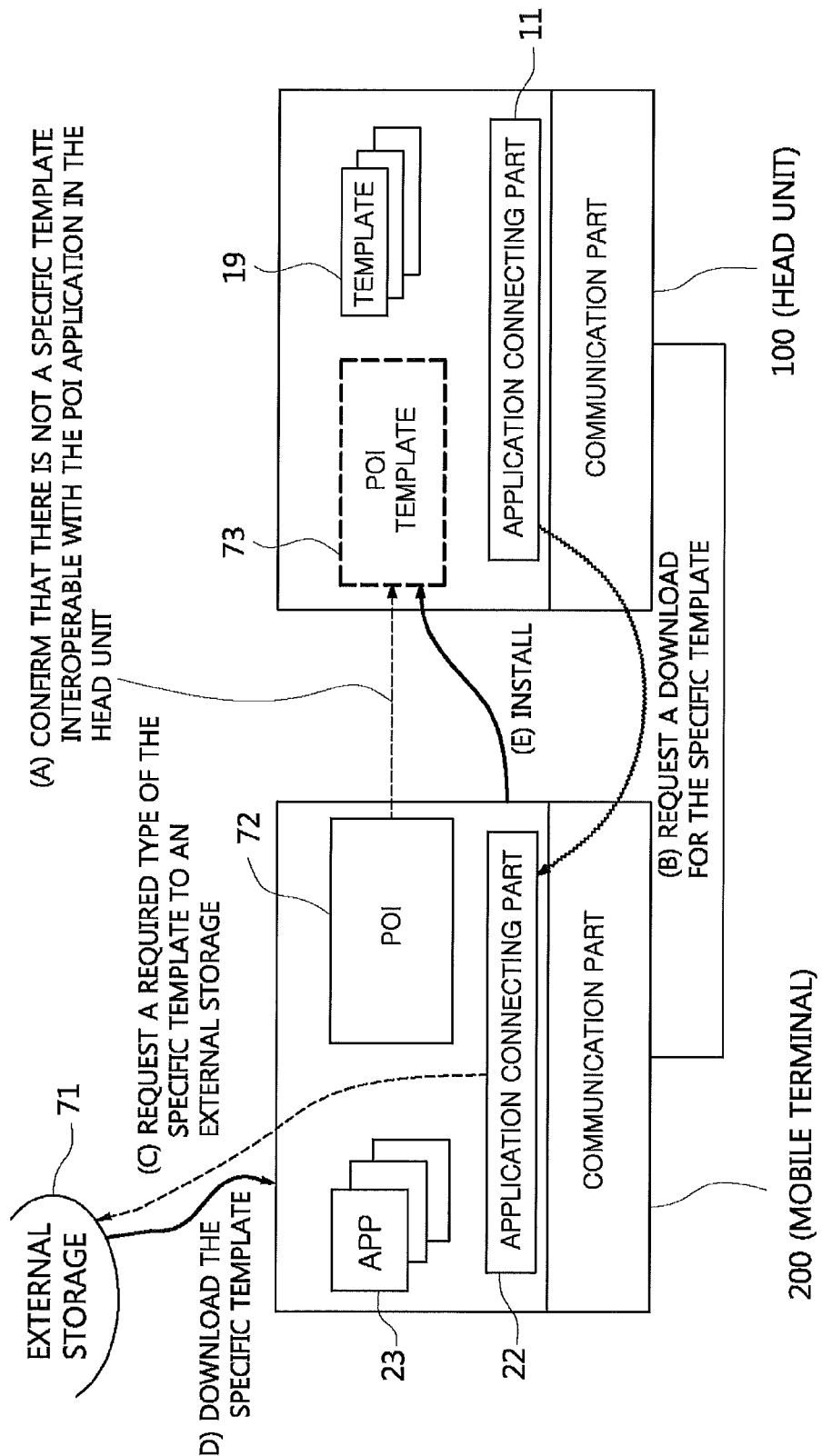

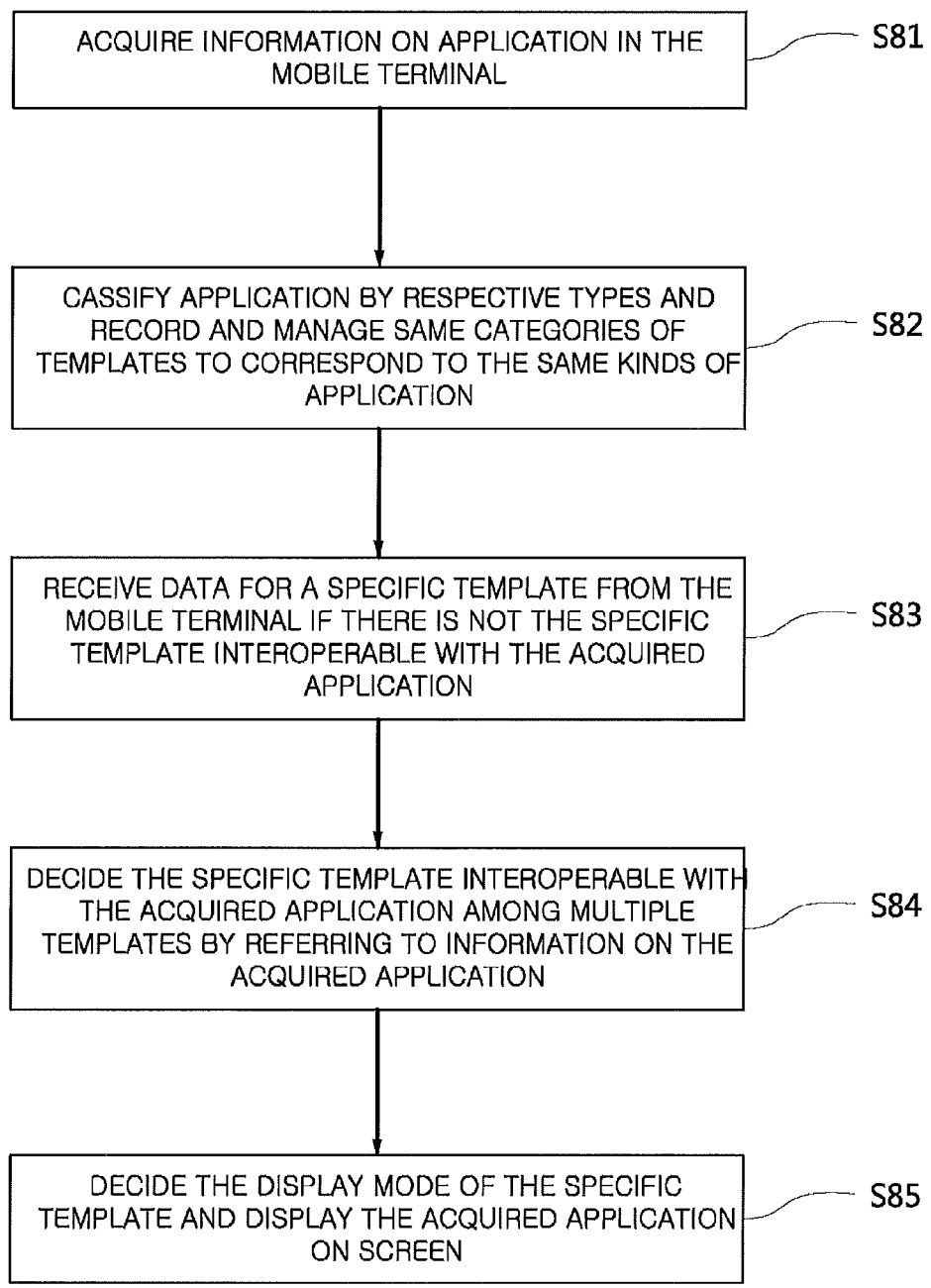

METHOD FOR CONFIGURING USER INTERFACE OF HEAD UNIT OF VEHICLE DYNAMICALLY BY USING MOBILE TERMINAL, AND HEAD UNIT AND COMPUTER-READABLE RECORDING MEDIA USING THE SAME

CROSS REFERENCE TO RELATED APPLICATION

This application claims priority to and incorporates herein by reference all disclosure in Korean Patent Application No. 10-2014-0031622 filed Mar. 18, 2014.

FIELD OF THE INVENTION

The present invention relates to a method for configuring a user interface of a vehicle head unit dynamically by using a mobile terminal and a head unit, and a computer-readable media using the same; and more particularly, to the method for providing a dynamic configuration of a screen based on a template used for displaying a running state of an application of the mobile terminal on the head unit in an environment where the vehicle head unit is connected with the mobile terminal through various communication channels and for providing a dynamic configuration of the screen even if there is no layout information required to configure the screen and the head unit and the computer-readable media using the same.

BACKGROUND OF THE INVENTION

An approach for processing an application of a mobile terminal, including a smart phone, a smart pad, a laptop, etc. applied to a vehicle head unit at an initial stage was a mirroring method which shows a screen of the mobile terminal through the head unit as it is. It has an advantage of grafting an environment of the mobile terminal onto the vehicle head unit as it is, but it has a disadvantage of difficulty in flexibly dealing with requirements of original equipment makers (OEMs) of vehicles. Because it displays a complicated screen of the mobile terminal as it is or shows partially changed items on the head unit, drivers cannot concentrate on driving.

SUMMARY OF THE INVENTION

It is an object of the present invention to solve all the problems mentioned above.

It is another object of the present invention to provide a method for accommodating a variety of applications of a mobile terminal(s) in a head unit at a low cost.

It is still another object of the present invention to provide a method for giving various changes to a template depending on a setting of a user application or a vehicle maker.

It is still yet another object of the present invention to provide a method for selecting an optimal template depending on the number of applications provided from the mobile terminal(s).

It is still yet another object of the present invention to provide a method for selecting an optimal template depending on the driving mode of the vehicle.

In accordance with one aspect of the present invention, there is provided a method for configuring a user interface of a head unit of a vehicle by using a mobile terminal, including steps of: (a) allowing the head unit of the vehicle to acquire information on at least one application stored at an executable state in the mobile terminal, if the mobile terminal is connected to the head unit; (b) allowing the head unit to decide a specific template interoperable with the application among multiple templates stored in the head unit by referring to the acquired information on the application; and (c) deciding a display mode of the specific template by referring to at least one piece of information on the number of acquired application and the driving state of the vehicle and displaying the acquired application on a screen of the head unit by using the decided display mode of the specific template.

In accordance with another aspect of the present invention, there is provided a head unit of a vehicle for configuring a user interface thereof by using a mobile terminal, including; an application connecting part for acquiring information on at least one application stored at an executable state in the mobile terminal, if the mobile terminal is connected thereto; a template matching part for deciding a specific template interoperable with the application among multiple templates stored in the head unit by referring to the acquired information on the application; and a display managing part for deciding a display mode of the specific template by referring to at least one piece of information on the number of the acquired application and the driving state of the vehicle and displaying the acquired application on a screen thereof by using the decided display mode of the specific template.

BRIEF DESCRIPTION OF THE DRAWINGS

The above and other objects and features of the present invention will become apparent from the following description of preferred embodiments given in conjunction with the accompanying drawings, in which:

FIG. 4 shows an example of a full display mode and a floating display mode respectively.

FIG. 7 shows a process of acquiring data on a new specific template.

FIG. 8 is a flowchart showing a method for configuring the user interface of the vehicle head unit dynamically by using a mobile terminal in accordance with the present invention.

DETAILED DESCRIPTION OF THE PREFERRED EMBODIMENTS

Figure 1:
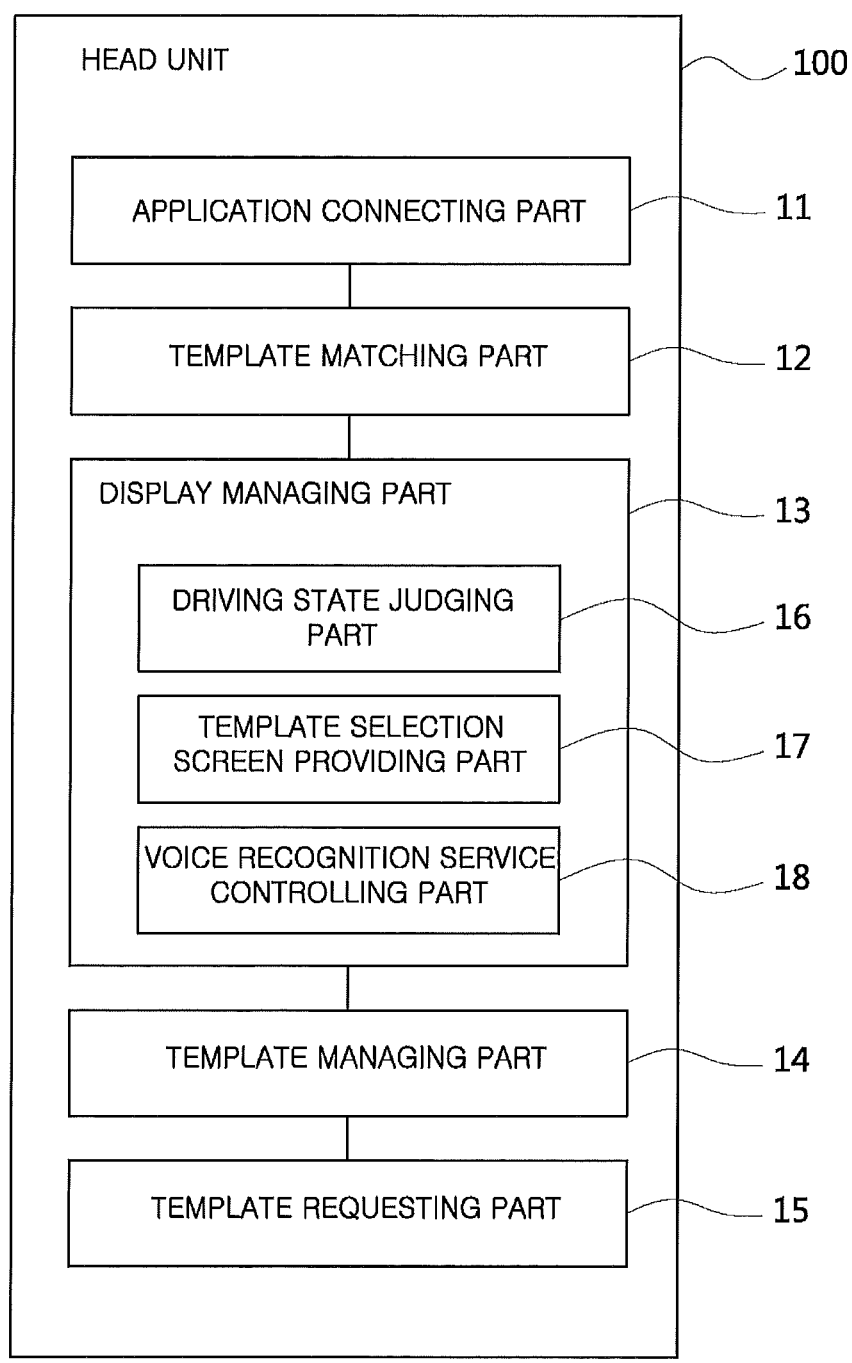
FIG. 1 is a block diagram showing a configuration of a vehicle head unit in accordance with the present invention.

The detailed description of the present invention illustrates specific embodiments in which the present invention can be performed with reference to the attached drawings.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the location or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to the present invention to be carried out easily, the example embodiments of the present invention by referring to attached diagrams will be explained in detail as follows:

FIG. 1 is a block diagram showing a configuration of a vehicle head unit in accordance with the present invention.

By referring to FIG. 1, a head unit 100 in accordance with the present invention is a head unit of a vehicle capable of configuring a user interface dynamically by using a mobile terminal.

In accordance with the present invention, the head unit 100 may include an application connecting part 11, a template matching part 12, and a display managing part 13 and further include a template managing part 14 and a template requesting part 15, as the case may be. Besides, the display managing part 13 may include a driving state judging part 16, a template selection screen providing part 17 and a voice recognition service controlling part 18.

When a mobile terminal is connected, the application connecting part 11 performs a function of acquiring information on one or more applications stored in the mobile terminal at an executable state.

By referring to the information on the applications acquired from the application connecting part 11, the template matching part 12 performs a function of deciding a specific template which can interoperate with the acquired applications among multiple templates stored in the head unit 100.

Figure 2:
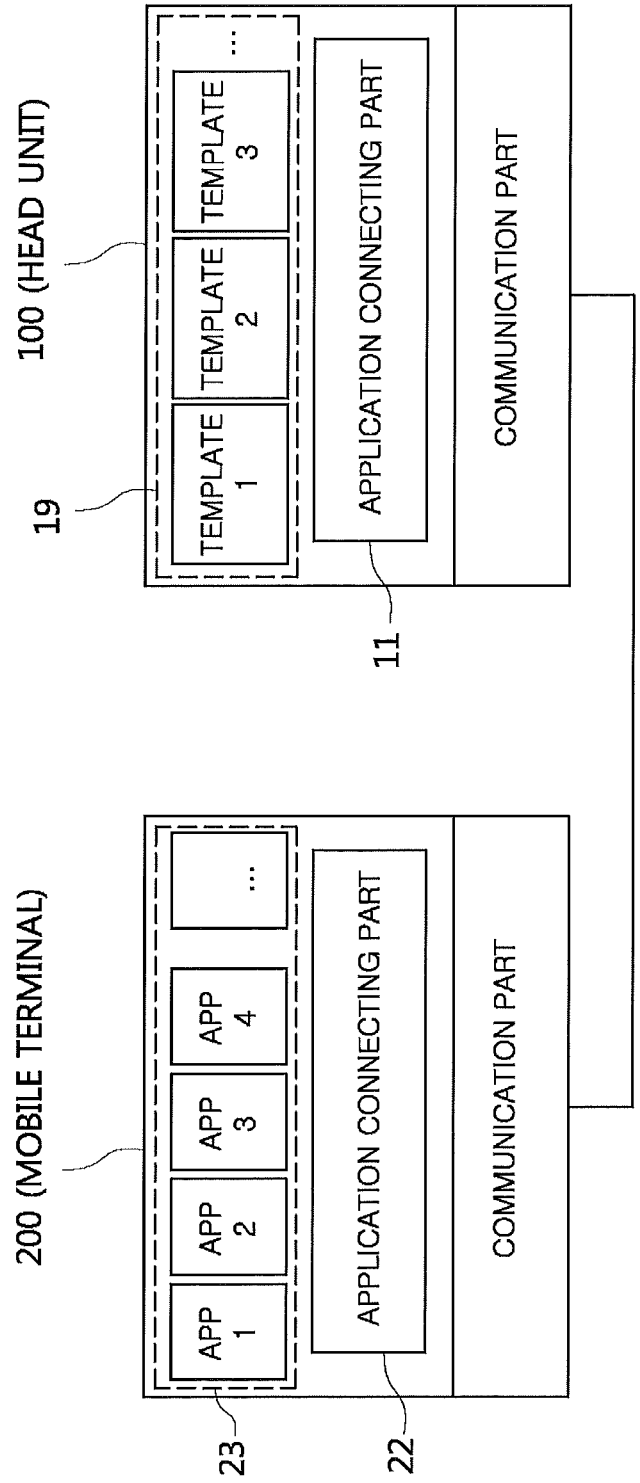
FIG. 2 shows configurations of basic screens of applications of a mobile terminal and those of templates of a head unit in accordance with the present invention.

FIG. 2 shows configurations of screens of applications of the mobile terminal and those of templates of the head unit in accordance with the present invention.

By referring to FIG. 2, there are several applications 23, in the mobile terminal such as a smart phone, that are connectable with the vehicle head unit 100 and there are a plurality of templates 19, in the head unit, which may interoperate with the applications of the mobile terminal. A mobile terminal 200 and the head unit 100 may be connected with each other through wired communication, e.g., USB, or wireless communication, e.g., Bluetooth, WIFI. Further, a connection between the mobile terminal and the head unit may be detected through respective application connecting parts 22 and 11 which are included in the mobile terminal 200 and the head unit 100, respectively. By referring to information on the applications 23 of the mobile terminal 200, the template matching part 12 finds at least one specific template which is connectable with the applications 23 among a plurality of templates 19 and matches the applications 23 and the specific template.

By referring to FIG. 1 again, the display managing part 13 performs a function of displaying an application (at least one among the applications of the mobile terminal received from the application connecting part 11 of the head unit 100) that could interoperate with it through a specific template on a screen of the head unit 100. Besides, when the application is displayed on the head unit, the display managing part 13 decides a display mode of the specific template by referring to at least one piece of information, i.e., information on the number of acquired applications and/or information on the driving state of the vehicle, and displays the acquired applications based on the display mode on the screen of the head unit 100.

The display mode for the specific template decided by the display managing part 13 may include information on arrangement or size of the specific template on the screen.

Furthermore, if there is only one application acquired by the head unit 100, the display managing part 13 may display the acquired application on the screen of the head unit based on a full display mode that displays the acquired application through a specified area in the screen which exceeds a preset ratio of the whole area of the screen. In some case, the specified area can indicate the whole area of the screen.

If there are multiple applications acquired by the head unit 100, the driving state judging part 16 included in the display managing part 13 performs a function of judging whether the vehicle is driven. If the driving state judging part 16 determines that the vehicle is driven, the display managing part 13 displays the acquired applications on the screen of the head unit based on a minimized display mode which does not expose a layout on the screen and if the driving state judging part 16 determines that the vehicle is not driven, the display managing part 13 displays the acquired applications thereon based on a floating display mode which displays a layout for exposing the multiple applications at the same time on the screen.

Figure 3:
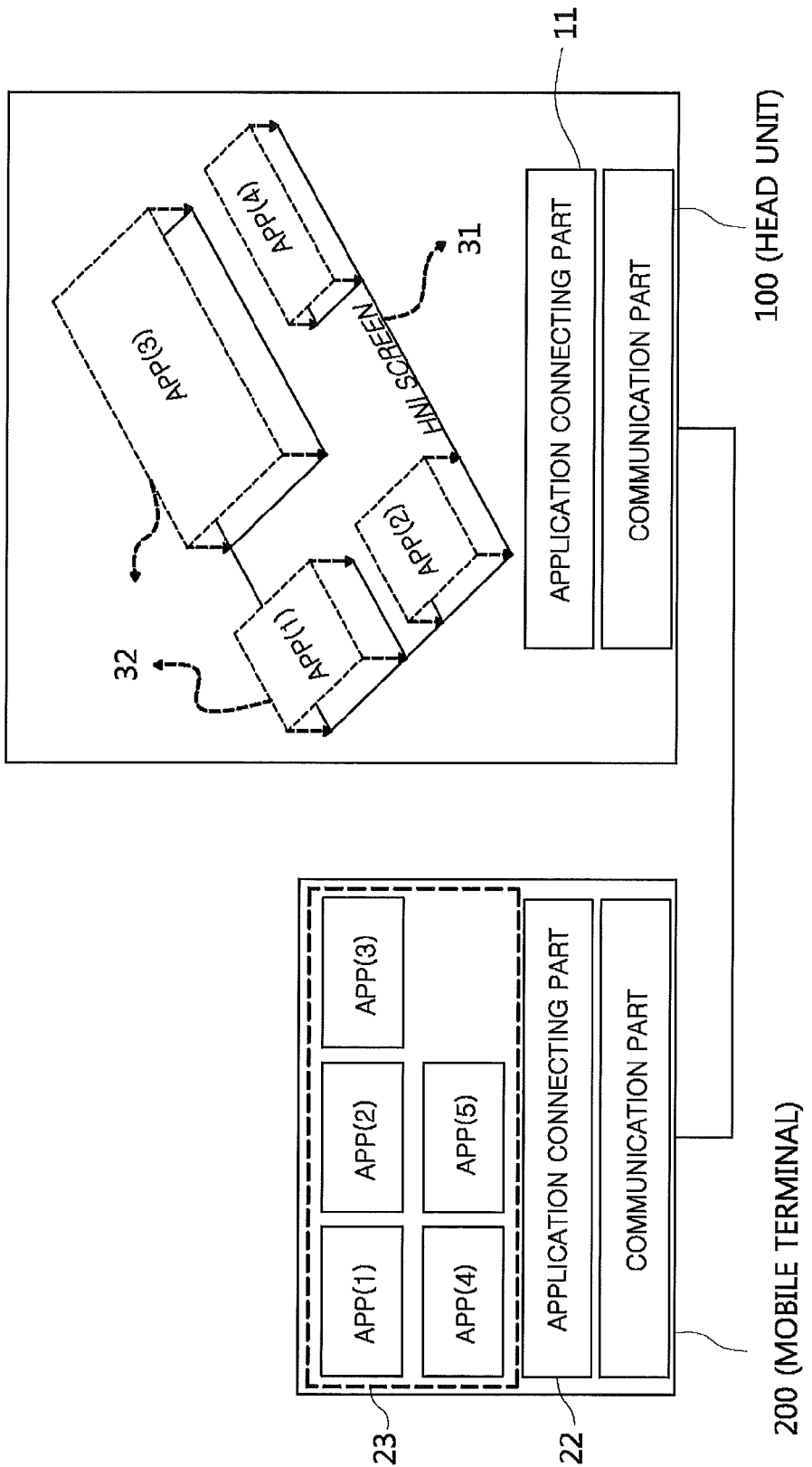
FIG. 3 shows a floating display mode of the head unit in accordance with the present invention.

FIG. 3 shows the floating display mode of the head unit in accordance with the present invention.

By referring to FIG. 3, the floating display mode is executed to make multiple applications displayed in a form of dynamic screen 32 at the same time in an original head unit HMI display window 31 in the screen of the head unit 100.

In other words, the display mode provided by the display managing part 13 may provide the full display mode, the minimized display mode, the floating display mode, etc. The full display mode is a mode of supporting one selected application to occupy the full screen of the head unit 100 or to be displayed in a specified area in the screen which exceeds a preset ratio of the whole area of the screen. Further, the minimized display mode is a mode without displaying any layout in a Human Machine Interface (HMI) thereof. Further, the minimized display mode can be provided on the current screen in a form of on screen display (OSD) if being supported in the specification of the head unit. In addition, the floating display mode is a display mode which provides a layout for exposing multiple applications at the same time on the screen of the head unit.

FIG. 4 shows an example of the full display mode and the floating display mode respectively.

If there are multiple acquired applications, the template selection screen providing part 17 included in the display managing part 13 provides a selection screen to allow a user to select a template among all available templates corresponding to the acquired applications which are arranged in order of preferred applications frequently used by the user. Herein, if there is no information on such preferred applications, the template selection screen providing part 17 provides a selection screen to allow the user to select a template among all available templates corresponding to the acquired applications which are arranged in order of registration in the head unit 100.

The voice recognition service controlling part 18 included in the display managing part 13 performs a function of supporting the acquired applications to be controlled through the voice recognition service, if the acquired applications are displayed on the screen of the head unit 100 based on the minimized display mode.

Figure 5:
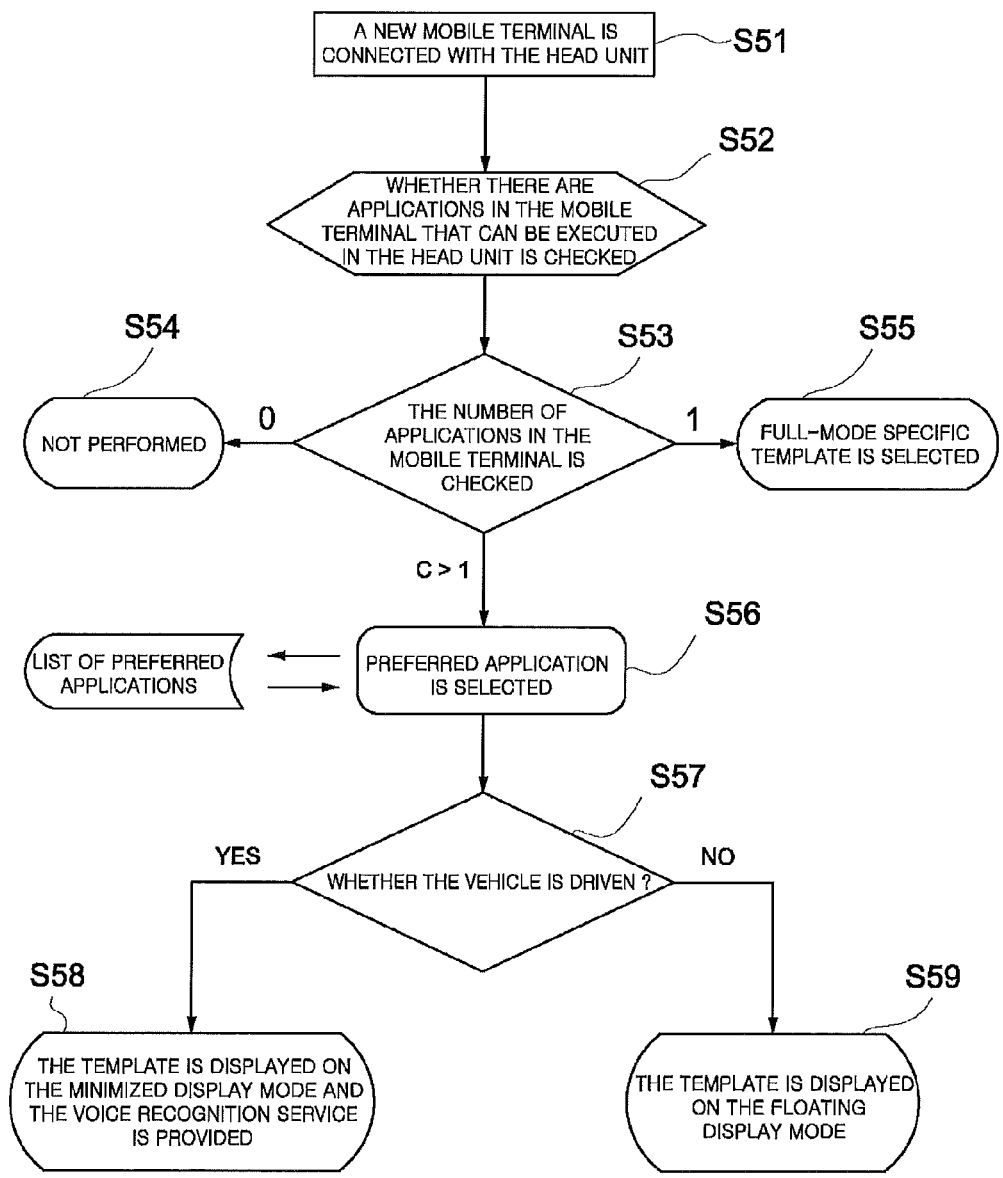
FIG. 5 is a flowchart illustrating a course of selecting a template mode in accordance with the present invention.

FIG. 5 is a flowchart illustrating a course of selecting a template mode in accordance with the present invention.

By referring to FIG. 5, whether a new mobile terminal is connected with the head unit is recognized at a step of S51 and then whether there are applications in the mobile terminal that can be executed in the head unit is checked at a step of S52. The number of applications in the mobile terminal that can be executed in the head unit is checked at a step of S53 and if there is no executable application a template is not provided at a step of S54. If there is one executable application, a specific interoperable template is displayed based on the full display mode at a step of S55. If there are two or more executable applications, a screen for allowing a user to select a certain template among all available templates corresponding to the applications which are sorted in order of preferred applications frequently used by the user is provided at a step of S56. If there is no information on such preferred applications, the screen for allowing the user to select the certain template among all available templates corresponding to the applications which are sorted in order of registration in the head unit 100 may be provided at a step of S56. By reference, the step of S56 may be omitted as well. In addition, the driving state judging part 16 decides whether the vehicle is driven at a step of S57 and if the vehicle is driven, the template is displayed on the minimized display mode and the voice recognition service controlling part 18 may allow the user to control the applications through the voice recognition service at a step of S58. If the vehicle is not driven, multiple floating objects are provided for the user based on a floating display mode at a step of S59.

In short, as illustrated in FIG. 5, if there is only one application provided by the mobile terminal, it is desirable to run a template on the full display mode. If there are multiple applications, the types of preferred applications are brought through the user's list of preferred applications in connection with the user terminal authentication and if there is no user's list of preferred applications, initially registered application(s) is floated on the screen of the head unit. In the case, if the vehicle is not driven and if it is at the state of supporting multiple applications, the applications are executed on the floating display mode and if the vehicle is driven, the applications are executed on the minimized display mode and, if it is possible, the state of the applications of the mobile terminal are provided or controlled through a voice guidance service.

If the vehicle is driven, it would be good to support the full display mode in principle among the three modes. However, exceptionally, it is desirable to support only the full display mode irrespective of whether the vehicle is driven if an application is a navigation application. For mode conversion among the three modes, an input method designated by an OEM may be used. As an example, voice recognition, a jog key, a steering wheel button, etc. could be used.

By referring to FIG. 1, the template managing part 14 performs a function of classifying applications, which are possible to interoperate with the head unit, into applications in several types, including a music-replaying application, a news-providing application, or a navigation application and a function of recording and managing same types of applications to correspond to same kinds of templates.

Figure 6:
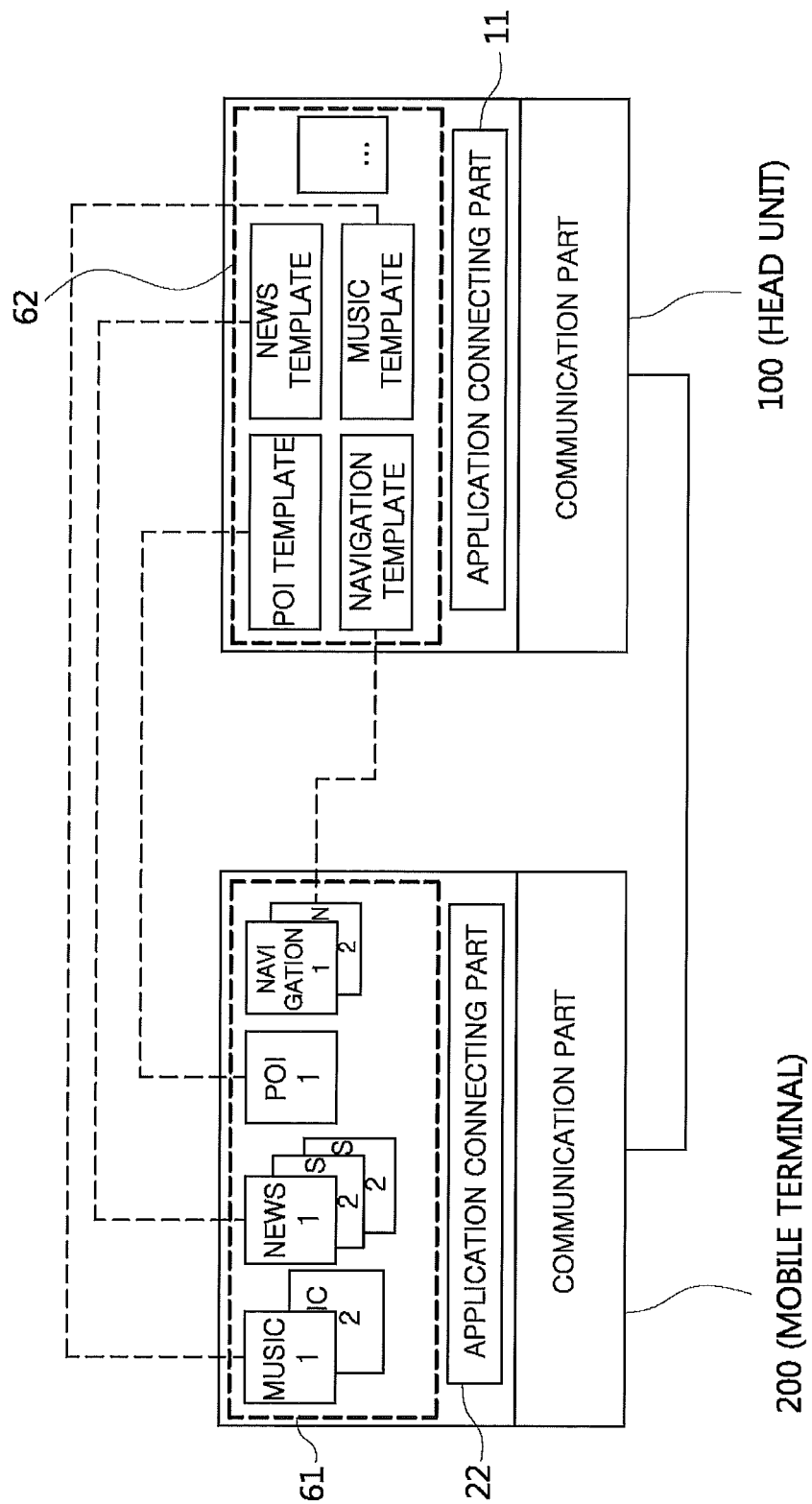
FIG. 6 illustrates applications interoperating with template UIs classified by respective types.

FIG. 6 illustrates applications interoperating with template UIs classified by respective types.

By referring to FIG. 6, the head unit 100 in accordance with the present invention classifies the applications of the mobile terminal by respective types and makes the classified applications 61 interoperate with the same kinds of templates among all the templates 62.

By referring to FIG. 6, the application connecting part 11 in the head unit 100 allows the template HMI requested by an application, required to be registered in the head unit 100, of the mobile terminal to be displayed on the screen by referring to information on a template type and a template mode of the application. Herein, the template type shows the application type, and the template type is selected during the course of authentication and registration of the application at the initial state.

Besides, if there is no specific template in the head unit 100 that can interoperate with the acquired application, the template requesting part 15 performs a function of informing the mobile terminal of it and receiving data for the specific template from the mobile terminal.

FIG. 7 shows a process of acquiring data on a new specific template.

When the request for registering a specific application is received by the application connecting part 11 in the head unit 100 and a type of a template which corresponds to the specific application does not exist in the head unit, it should be processed through remote installation. In general, because the head unit does not have a communication function, data for installing the template corresponding to the specific application is brought by using the communication function of the mobile terminal and the template is installed in the head unit.

By referring to FIG. 7, if a POI application 72 which requires a specific template, i.e., a template type of POI, is requested to be registered in the head unit 100 and if there is not the specific template 73 interoperable with the POI application 72 in the head unit 100 (a), the template requesting part 15 requests a download for data on the specific template to an application connecting part 22 of the mobile terminal (b). Then, the mobile terminal 200 requests the data on the specific template to an external storage 71 (c), and receives the data on the specific template from the external storage 71 (d). After that, the downloaded template is transmitted to the head unit 100 by the mobile terminal 200 and the head unit 100 updates a list of the stored templates (e).

FIG. 8 is a flowchart showing a method for configuring a user interface of the head unit dynamically by using a mobile terminal in accordance with the present invention.

By referring to FIG. 8, first of all, if the mobile terminal is connected with the head unit, the head unit acquires information on at least one application stored at the executable state in the mobile terminal at a step of S81. The step of S81 is performed by the aforementioned application connecting part 11.

The head unit classifies interoperable applications by respective types and records and manages same categories of templates to correspond to the same kinds of applications at a step of S82.

If there is not the specific template interoperable with the acquired application in the head unit, the head unit informs the mobile terminal of it and receives the data for the specific template from the mobile terminal at a step of S83. Because this step was explained through FIG. 7, the redundant explanation is omitted.

By referring to information on the acquired applications, the head unit decides the specific template interoperable with the acquired applications among its multiple templates at a step of S84.

After that, the head unit decides the display mode of the specific template by referring to at least one piece of information on the number of acquired applications, the driving state of the car, etc. and displays the acquired applications on its screen based on the decided display mode of the specific template at a step of S85. At the time, it is desirable that the display mode of the specific template includes information on the arrangement or the size of the specific template on the screen.

This step was explained through FIGS. 2 to 5. By referring to FIGS. 2 to 5, one example embodiment of the step of S85 is explained as follows:

If there is only one application acquired by the head unit, the acquired application is displayed on the screen of the head unit based on the full display mode which displays the acquired application through a specified area in the screen which exceeds a preset ratio of the whole area of the screen.

By referring to FIG. 5, if there are multiple acquired applications, the step of S85 may include steps of providing a screen for allowing a user to select a certain template among all available templates corresponding to applications which are sorted in order of preferred applications frequently used by the user. Further the step of S85 may further include detailed steps of S85-a, S85-b and S85-c as follows:

If there is no information on the preferred applications, the screen for allowing the user to select the certain template among all available templates corresponding to the applications which are sorted in order of registration in the head unit at a step of S85-a, if there are multiple applications acquired by the head unit, the driving state of the vehicle is determined at a step of S85-b, and if the vehicle is determined to be driven, the acquired applications are displayed on the screen of the head unit based on the minimized display mode on which the layout is not exposed on the screen of the head unit and, if the vehicle is determined not to be driven, the acquired applications are displayed on the screen of the head unit based on the floating display mode on which a layout for exposing all the acquired applications at the same time is provided on the screen of the head unit at a step of S85-c.

At a step of S85-c, if the acquired applications are displayed on the screen of the head unit based on the minimized display mode, it can be supported to control the applications through the voice recognition service.

According to the method for configuring the user interface of the vehicle dynamically, it has an effect for accommodating a variety of applications of the mobile terminals onto the head unit at a low cost.

In addition, the present invention has the effect of giving a variety of changes depending on the setting of user applications of vehicle makers.

Besides, the present invention may allow an optimal template to be selected depending on the number of applications provided by the mobile terminal and also depending on information on whether the vehicle is driven.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for configuring a user interface of a head unit of a vehicle by using a mobile terminal, comprising steps of:
   (a) acquiring, via the head unit of the vehicle, information on at least one application stored at an executable state in the mobile terminal, when the mobile terminal is connected to the head unit;
   (b) deciding, via the head unit, a specific template interoperable with the application among multiple templates stored in the head unit by referring to the acquired information on the application; and
   (c) deciding, via the head unit, a display mode of the specific template by referring to at least one piece of information on the number of application and the driving state of the vehicle and displaying a running state of the application on a screen of the head unit by using the decided display mode of the specific template,
   wherein the step of (c) includes the steps of: (c1) deciding, via the head unit, whether the vehicle is driven when there are multiple applications; and (c2) displaying the running state of applications on the screen of the head unit based on a minimized display mode on which a layout is not exposed on the screen of the head unit when the vehicle is determined to be driven; and displaying the running state of applications on the screen of the head unit based on a floating display mode on which a layout for exposing all the applications at the same time is provided on the screen of the head unit when the vehicle is determined not to be driven.

2. The method of claim 1, wherein the head unit classifies the application by respective types and records and manages the same categories of templates to correspond to the same kinds of application.

3. The method of claim 1, wherein, at the step of (b), when there is not the specific template interoperable with the application in the head unit, the head unit informs the mobile terminal of it and receives data for the specific template from the mobile terminal.

4. The method of claim 1, wherein, at the step of (c), the display mode of the specific template includes information on the arrangement or the size of the specific template on the screen.

5. The method of claim 1, wherein, at the step of (c), when the number of application stored at the executable state in the mobile terminal is one, the running state of the application is displayed on the screen of the head unit based on a full display mode capable of displaying the running state of the application fully in the screen.

6. The method of claim 1, wherein, before the step of (c1), the step of (c) includes the step of: (c0) providing a screen for allowing a user to select a certain template among all available templates corresponding to the applications sorted in order of preferred applications frequently used by the user when there are multiple applications; and providing a screen for allowing the user to select the certain template among all available templates corresponding to the applications sorted in order of registration in the head unit when there is no information on the preferred applications.

7. The method of claim 1, wherein at the step of (c2), when the running state of the application is displayed on the screen of the head unit based on the minimized display mode, it is supported to control the application through a voice recognition service.

8. A head unit of a vehicle for configuring a user interface thereof by using a mobile terminal, comprising;
- an application connecting part for acquiring information on at least one application stored at an executable state in the mobile terminal, when the mobile terminal is connected thereto;
- a template matching part for deciding a specific template interoperable with the application among multiple templates stored in the head unit by referring to the acquired information on the application; and
- a display managing part for deciding a display mode of the specific template by referring to at least one piece of information on the number of the application and the driving state of the vehicle and displaying a running state of the application on a screen thereof by using the decided display mode of the specific template,
- wherein the display managing part includes a driving state judging part for deciding whether the vehicle is driven when there are multiple applications; and the display managing part displays the running state of applications on the screen of the head unit based on a minimized display mode on which a layout is not exposed on the screen of the head unit when the driving state judging part determines the vehicle is driven; and the display managing part displays the running state of applications on the screen of the head unit based on a floating display mode on which a layout for exposing all the applications at the same time is provided on the screen of the head unit when the vehicle is determined not to be driven.

9. The head unit of claim 8, further comprising: a template managing part for classifying the application by respective types and recording and managing the same categories of templates to correspond to the same kinds of application.

10. The head unit of claim 8, further comprising: a template requesting part for informing the mobile terminal of the fact that there is no specific template interoperable with the application therein and receiving data for the specific template from the mobile terminal.

11. The head unit of claim 8, wherein the display mode for the specific template decided by the display managing part includes the information on the arrangement or the size of the specific template on the screen.

12. The head unit of claim 8, wherein, when the number of application stored at the executable state in the mobile terminal is one, the display managing part displays the running state of the application based on a full display mode capable of displaying the running state of the application fully in the screen.

13. The head unit of claim 8, wherein the display managing part includes a template selection screen providing part for providing a screen for allowing a user to select a certain template among all available templates corresponding to the applications sorted in order of preferred applications frequently used by the user when there are multiple applications; and providing a screen for allowing the user to select the certain template among all available templates corresponding to the applications sorted in order of registration in the head unit when there is no information on the preferred applications.

14. The head unit of claim 8, wherein the display managing part includes a voice recognition service controlling part for supporting to control the application through a voice recognition service when the running state of the application is displayed on the screen of the head unit based on the minimized display mode.

15. One or more non-transitory computer-readable recording media having stored thereon a computer program that, when executed by one or more processors, causes the one or more processors to perform acts including:
- (a) acquiring, via a head unit of a vehicle, information on at least one application stored at an executable state in a mobile terminal, when the mobile terminal is connected to the head unit;
- (b) deciding, via the head unit, a specific template interoperable with the application among multiple templates stored in the head unit by referring to the acquired information on the application; and
- (c) deciding, via the head unit, a display mode of the specific template by referring to at least one piece of information on the number of application and the driving state of the vehicle and displaying a running state of the application on a screen of the head unit by using the decided display mode of the specific template,
- wherein the step of (c) includes the steps of: (c1) deciding, via the head unit, whether the vehicle is driven when there are multiple applications; and (c2) displaying the running state of applications on the screen of the head unit based on a minimized display mode on which a layout is not exposed on the screen of the head unit when the vehicle is determined to be driven; and displaying the running state of applications on the screen of the head unit based on a floating display mode on which a layout for exposing all the applications at the same time is provided on the screen of the head unit when the vehicle is determined not to be driven.

* * * * *